United States Patent
Ohara et al.

(10) Patent No.: US 10,160,461 B2
(45) Date of Patent: Dec. 25, 2018

(54) DRIVE ASSIST SYSTEM AND NON-TRANSITORY COMPUTER-READABLE MEDIUM

(71) Applicant: ZENRIN Co., LTD., Kitakyushu-shi (JP)

(72) Inventors: Hiroyuki Ohara, Kitakyushu (JP); Takanori Masuoka, Kitakyushu (JP); Nobusuke Matsuo, Kitakyushu (JP)

(73) Assignee: Zenrin Co., Ltd., Kitakyushu-shi (JP)

( * ) Notice: Subject to any disclaimer, the term of this patent is extended or adjusted under 35 U.S.C. 154(b) by 0 days.

(21) Appl. No.: 15/371,686

(22) Filed: Dec. 7, 2016

(65) Prior Publication Data

US 2017/0120928 A1    May 4, 2017

Related U.S. Application Data

(63) Continuation of application No. 14/815,497, filed on Jul. 31, 2015, now Pat. No. 9,650,055.

(30) Foreign Application Priority Data

Sep. 12, 2014 (JP) .................................. 2014-186414

(51) Int. Cl.
*B60W 50/06* (2006.01)
*B60W 30/12* (2006.01)
(Continued)

(52) U.S. Cl.
CPC ............ *B60W 50/06* (2013.01); *B60W 30/12* (2013.01); *B60W 30/143* (2013.01);
(Continued)

(58) Field of Classification Search
CPC .... B60W 50/06; B60W 30/12; B60W 30/143; B60W 30/18009; B60W 2550/143;
(Continued)

(56) References Cited

U.S. PATENT DOCUMENTS 7,124,027 B1 * 10/2006 Ernst, Jr. ................ B60W 30/09
701/301
7,400,963 B2 * 7/2008 Lee ..................... B60K 31/0066
180/171
(Continued)

FOREIGN PATENT DOCUMENTS

JP       2008-006947        1/2008
JP       2009-146011 A      7/2009
(Continued)

*Primary Examiner* — Anne M Antonucci
*Assistant Examiner* — James E Stroud
(74) *Attorney, Agent, or Firm* — Xsensus LLP

(57) ABSTRACT

A drive assist system that includes circuitry that obtains information including at least one of acceleration/deceleration information and direction-of-travel information from a memory that stores at least one of the acceleration/deceleration information provided in relation to at least one of a set of a plurality of sections of a road and the direction-of-travel information provided in relation to at least one of the set of the plurality of sections of the road; obtains location information of a vehicle; and performs at least one of a acceleration/deceleration drive assist with regard to acceleration and/or deceleration of the vehicle based on the location information and the acceleration/deceleration information, and a direction drive assist with regard to a direction of travel of the vehicle based on the location information and the direction-of-travel information.

26 Claims, 11 Drawing Sheets

(51) Int. Cl.
*B60W 30/14* (2006.01)
*B60W 30/18* (2012.01)

(52) U.S. Cl.
CPC . *B60W 30/18009* (2013.01); *B60W 2550/143* (2013.01); *B60W 2550/146* (2013.01); *B60W 2550/402* (2013.01); *B60W 2720/10* (2013.01); *B60W 2720/106* (2013.01)

(58) Field of Classification Search
CPC ..... B60W 2550/146; B60W 2550/402; B60W 2720/10; B60W 2720/106; G01C 21/3492
USPC .......................................................... 701/70
See application file for complete search history.

(56) References Cited

U.S. PATENT DOCUMENTS

| | | | | |
|---|---|---|---|---|
| 7,536,254 | B2* | 5/2009 | Kumagai | G08G 1/0104 340/934 |
| 8,103,435 | B2* | 1/2012 | Yang | G01C 21/3492 701/117 |
| 8,731,808 | B2* | 5/2014 | Tashiro | G01C 21/32 701/118 |
| 9,286,795 | B2* | 3/2016 | Vorona | G08G 1/0104 |
| 9,650,043 | B2* | 5/2017 | Lee | B60W 30/143 |
| 2003/0093209 | A1* | 5/2003 | Andersson | B60K 31/0058 701/93 |
| 2003/0204299 | A1* | 10/2003 | Waldis | B60K 31/0008 701/96 |
| 2006/0058940 | A1* | 3/2006 | Kumagai | G08G 1/096716 701/117 |
| 2006/0064234 | A1* | 3/2006 | Kumagai | G08G 1/0104 701/117 |
| 2007/0078584 | A1* | 4/2007 | Nakamura | B60T 7/22 701/93 |
| 2012/0316746 | A1* | 12/2012 | Park | B60W 10/06 701/93 |
| 2014/0067226 | A1* | 3/2014 | Lee | B60W 30/143 701/96 |
| 2015/0151725 | A1* | 6/2015 | Clarke | B60W 30/00 701/28 |
| 2015/0321667 | A1* | 11/2015 | Fukata | B60W 50/12 701/70 |
| 2016/0016564 | A1* | 1/2016 | Otake | B60W 40/076 701/75 |
| 2016/0046237 | A1* | 2/2016 | Sugimoto | B60R 1/00 348/148 |
| 2016/0046290 | A1* | 2/2016 | Aharony | G06K 9/00798 701/41 |
| 2016/0075336 | A1* | 3/2016 | Ohara | B60W 50/06 701/70 |
| 2016/0129836 | A1* | 5/2016 | Sugita | B60K 35/00 701/41 |
| 2016/0187149 | A1* | 6/2016 | Goto | B60W 50/14 701/522 |

FOREIGN PATENT DOCUMENTS

| | | |
|---|---|---|
| JP | 2010-117839 | 5/2010 |
| WO | WO 2010/143264 A1 | 12/2010 |

* cited by examiner

| LINK | AVERAGE SPEED PER HOUR |
|---|---|
| L1 —·—·— | 50km/h |
| L2 — — — | 20km/h |
| L3 ------ | 30km/h |
| L4 ——— | 50km/h |
| L5 — — — | 30km/h |

| SECTION | LEVEL | ACCELERATION DECELERATION CONTROL |
|---|---|---|
| K1 — — — | −2 | SIGNIFICANTLY DECELERATE |
| K2 —·—·— | −1 | SLIGHTLY DECELERATE |
| K3 ------ | 0 | NO CONTROL |
| K4 —··—·· | +1 | SLIGHTLY ACCELERATE |
| K5 ——— | +2 | SIGNIFICANTLY ACCELERATE |

| SECTION | LEVEL | DIRECTION OF TRAVEL CONTROL |
|---------|-------|------------------------------|
| K6 | -2 | SIGNIFICANTLY TURN TO THE RIGHT |
| K7 | -1 | SLIGHTLY TURN TO THE RIGHT |
| K8 | 0 | NO CONTROL |
| K9 | +1 | SLIGHTLY TURN TO THE LEFT |
| K10 | +2 | SIGNIFICANTLY TURN TO THE LEFT |

| SECTION | DIRECTION OF TRAVEL CONTROL | | ACCELERATION DECELERATION CONTROL | |
|---|---|---|---|---|
| | LEVEL | | LEVEL | |
| K11 | 0 | NO CONTROL | +1 | SLIGHTLY ACCELERATE |
| | +1 | SLIGHTLY TURN TO THE LEFT | −2 | SIGNIFICANTLY DECELERATE |
| K12 | 0 | NO CONTROL | +1 | SLIGHTLY ACCELERATE |
| K13 | +2 | SIGNIFICANTLY TURN TO THE LEFT | −2 | SIGNIFICANTLY DECELERATE |

| LINK | | LEVEL | ACCELERATION DECELERATION CONTROL |
|---|---|---|---|
| L1 | — - - — | −1 | SLIGHTLY DECELERATE |
| L2 (WITHIN 100 m FROM N2) | — - - — | −1 | SLIGHTLY DECELERATE |
| L2 (WITHIN 400 m FROM N3) | ▬▬▬▬▬ | −2 | SIGNIFICANTLY DECELERATE |
| L3 | - - - - - - | 0 | NO CONTROL |
| L4 (WITHIN 200 m FROM N3) | — - — - — | +1 | SLIGHTLY ACCELERATE |
| L4 (WITHIN 200 m FROM N6) | ▬▬▬▬▬ | +2 | SIGNIFICANTLY ACCELERATE |
| L5 | - - - - - - | 0 | NO CONTROL |

DRIVE ASSIST SYSTEM AND NON-TRANSITORY COMPUTER-READABLE MEDIUM

CROSS-REFERENCE TO RELATED APPLICATIONS

The present application is a continuation of application Ser. No. 14/815,497 filed on Jul. 31, 2015, which claims priority from Japanese Patent Application No. 2014-186414 filed on Sep. 12, 2014, the entirety of disclosure of which is hereby incorporated by reference into this application.

BACKGROUND

Technical Field

The present disclosure relates to a drive assist system.

Description of the Related Art

A drive assist system has been conventionally known to assist driving a vehicle. One proposed configuration of the drive assist system detects a curved section and the state of curvature in the curved section, based on information on vehicle location and map data.

The map data used in the above configuration includes road network data including a plurality of nodes that respectively represent intersections and a plurality of links that respectively represent roads and are arranged to interconnect the nodes, and additionally includes drawing information required for map display process and various guide information required for route guide process.

The drive assist system is accordingly required to perform a large number of arithmetic operations, for example, a process of extracting information used for drive assist from the map data and a process of using the extracted information to generate data for drive assist. Especially, in an application using an advanced driver assistance system (ADAS), the drive assist system needs to process information obtained from a large number of input devices. Accordingly, enormous amounts of information are to be processed by the drive assist system. Another problem of the related art drive assist system is difficulty in adequate drive assist since the conventional road network data includes the links set as sections suitable for route search.

There is accordingly a need for the technique that reduces the load of arithmetic processing for drive assist in the drive assist system. There is also a need for a technique of adequate drive assist.

SUMMARY

According to one aspect of the disclosure, there is provided a drive assist system, comprising: circuitry configured to: obtain information including at least one of acceleration/deceleration information and direction-of-travel information from a memory that stores at least one of the acceleration/deceleration information provided in relation to at least one of a set of a plurality of sections of a road and the direction-of-travel information provided in relation to at least one of the set of the plurality of sections of the road; obtain location information of a vehicle; and perform at least one of a acceleration/deceleration drive assist with regard to acceleration and/or deceleration of the vehicle based on the location information and the acceleration/deceleration information, and a direction drive assist with regard to a direction of travel of the vehicle based on the location information and the direction-of-travel information.

The disclosure may be implemented by various aspects other than the drive assist system. For example, the disclosure may be implemented by a drive assist apparatus, a drive assist method and a non-transitory recording medium in which a computer program for implementing this method is recorded.

DESCRIPTION OF EMBODIMENTS

A. First Embodiment

A1. System Configuration

Figure 1:
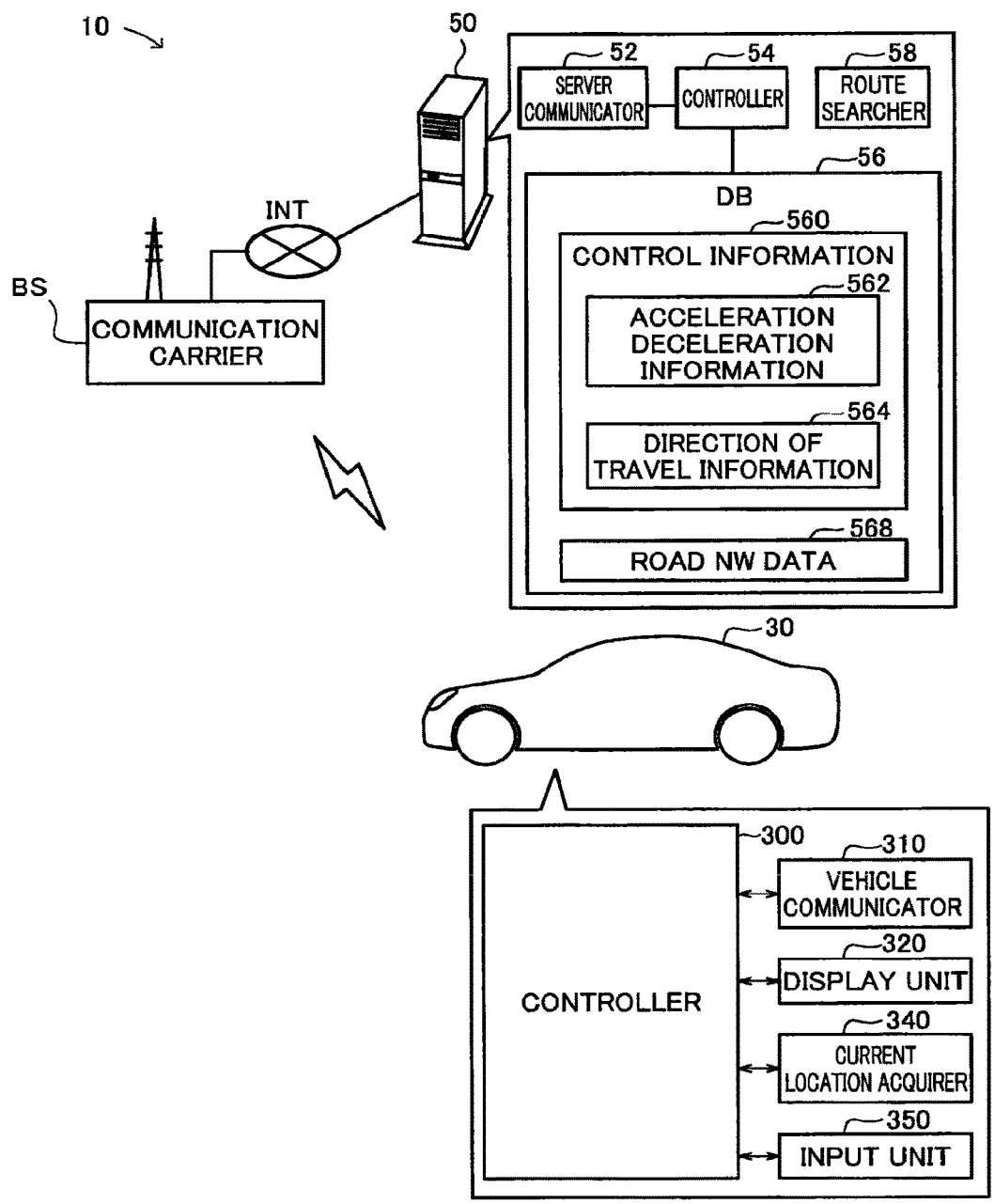
FIG. 1 is a diagram illustrating the configuration of a drive assist system according to one embodiment of the disclosure.

FIG. 1 is a diagram illustrating the configuration of a drive assist system 10 according to one embodiment of the disclosure. The drive assist system 10 is a drive assist system configured to support driving a vehicle 30 and includes a server 50 and the vehicle 30. The vehicle 30 and the server 50 are interconnected via the Internet INT. A communication carrier BS includes transmitting and receiving antenna, a radio base station and a switching center.

The vehicle 30 includes a controller 300, a vehicle communicator 310, a display unit 320, a current location acquirer 340 and an input unit 350. The controller 300 includes a RAM and a ROM. The controller 300 loads and executes a control program stored in the ROM on the RAM, so as to control the respective components of the vehicle 30. More specifically, the controller 300 controls the vehicle communicator 310, the display unit 320 and the current location acquirer 340 and also controls an accelerator, a brake, a steering wheel, optical axes of headlights and a suspension.

The vehicle communicator 310 is a device configured to make communication with the server 50 via the Internet INT under control of the controller 300. The vehicle communicator 310 includes an information acquirer and an information transmitter. The information acquirer is configured to obtain information including control information 560 and/or route information described later from a database 56 (also called "DB 56") of the server 50. The information transmitter is configured to send current location information obtained by the current location acquirer 340 to the server 50. According to this embodiment, the vehicle communicator 310 obtains information including at least one of acceleration deceleration information 562 and direction of travel information 564 described later and route information described later from the server 50, and sends current location information obtained by the current location acquirer 340 to the server 50. The display unit 320 is a device configured to display various images such as map images and route guide information. The current location acquirer 340 obtains current location information of the vehicle 30, based on radio waves received from GPS (global positioning system) satellites or signals of a gyroscope provided in the vehicle 30. The input unit 350 is a device configured to receive the user's input instructions for route setting or route guiding.

The server 50 includes a server communicator 52, a controller 54, a database 56 and a route searcher 58. The controller 54 includes a RAM and a ROM and loads and executes a control program stored in the ROM on the RAM, so as to control the respective components of the server 50. The server communicator 52 is a device configured to make communication with the vehicle 30 via the Internet INT under control of the controller 54. According to this embodiment, under control of the controller 54, the server communicator 52 obtains current location information from the vehicle 30 and sends acceleration deceleration information 562, direction of travel information 564 and road network data 568 included in the database 56 described below, as well as route information searched by the route searcher 48 to the vehicle 30. The database 56 is provided by a hard disk in this embodiment. Under control of the controller 54, the route searcher 58 performs a route search using the road network data 568 of the database 56 described below. The database 56 stores control information 560 (also called "control data 560") which is information provided in relation to each of a plurality of sections of the road and used to control driving the vehicle 30. According to this embodiment, the database 56 further stores road network data 568 (also called "road NW data 568"). The road network data 568 includes nodes that respectively represent a plurality of intersections and links that respectively represent roads and are arranged to interconnect the nodes. Each of the nodes and the links is stored in relation to pass cost information regarding a required time for the vehicle to pass through, and this pass cost information is used for a route search.

The control information 560 includes the acceleration deceleration information 562 (also called "acceleration deceleration data 562") and the direction of travel information 564 (also called "direction of travel data 564"). The acceleration deceleration information 562 is information provided in relation to each of the plurality of sections of the road and used for control of the acceleration and deceleration of the vehicle 30. The direction of travel information 564 is information provided in relation to each of the plurality of sections of the road and used for control with respect to the direction of travel of the vehicle 30.

According to this embodiment, the control information 560 includes section IDs, coordinate information specifying start points and terminal points of respective sections and information regarding levels of acceleration deceleration control and/or direction of travel control (hereinafter also called "control levels"). When a plurality of control levels are allocated to one identical road section, the storage includes its section ID, coordinate information specifying a start point and a terminal point of the section, information regarding a plurality of road directions ahead of the vehicle, and a plurality of control levels as described later. In this embodiment, information regarding a road direction ahead of the vehicle is stored in relation to each of the plurality of control levels. According to another embodiment, with regard to one identical road section, the storage may include a plurality of section IDs, coordinate information specifying a start point and a terminal point of the section in relation to each of the section IDs, information regarding a road direction ahead of the vehicle in relation to each of the section IDs and a control level in relation to each of the section IDs.

Figure 8:
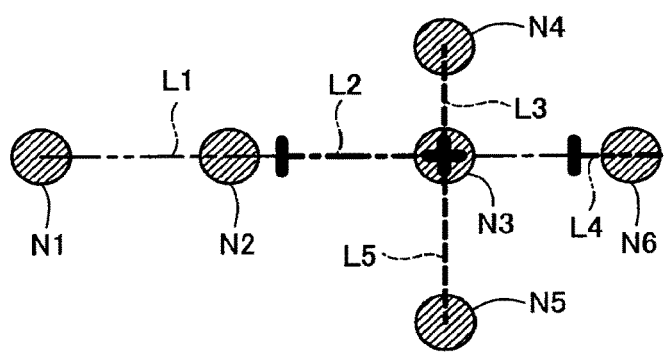
FIG. 8 is a diagram illustrating acceleration deceleration information according to a second embodiment.

According to this embodiment, the respective data stored in the database 56, i.e., the acceleration deceleration information, the direction of travel information and the road network data are expressed in a common coordinate system (latitude and longitude). Identical coordinates may be specifiable correspondingly for the respective data. The common coordinate system used is the latitude and longitude in this embodiment but may be relative coordinates in meshes by dividing the respective data in specified units. The respective data have the common coordinate system but are managed separately and independently. For example, updating one type of data among the data stored in the database 56 does not affect the other types of data. In a data structure that the road network data 568 is stored in relation to the control information 560 as shown in FIG. 8 described later, there is a need to store nodes representing end points in the control information 560, in addition to nodes and links included in the road network data 568. Accordingly, the total data volume is increased by addition of the data volume with regard to the nodes representing the end points in the control information 560 to the data volume of the road network data 568. In some cases, there is a requirement to use only as a navigation system (route search and route guide) without needing the drive assist functions (for example, acceleration deceleration control and steering control). In such cases, in the process of route search using the road network data 568 stored in relation to the control information 560, the route searcher needs to process node data representing the end points in the control information 560, in addition to link and node data for route search, irrespective of no requirement for the drive assist. This undesirably increases the load of arithmetic processing.

A2. Drive Assist

Figure 2:
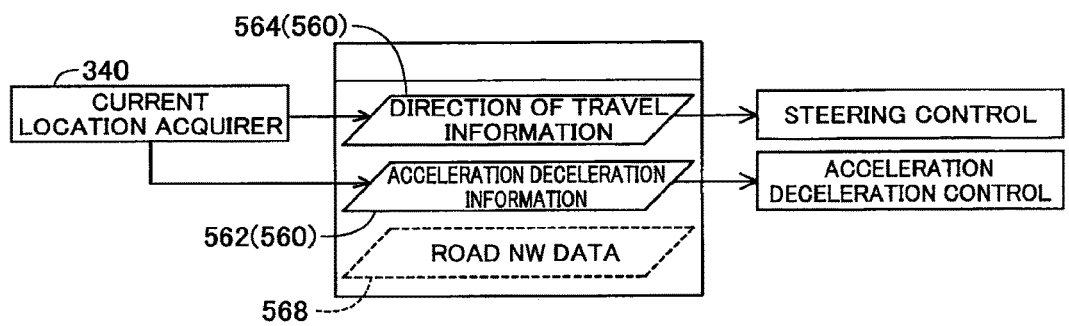
FIG. 2 is a diagram illustrating the relationship of control information to drive assist of a vehicle.

FIG. 2 is a diagram illustrating the relationship of the control information 560 to the drive assist of the vehicle 30. FIG. 2 illustrates the state that the controller 300 provides a drive assist of the vehicle 30, based on the current location information of the vehicle 30 obtained by the current location acquirer 340 and the control information 560.

The controller 300 provides an assist with regard to the direction of travel of the vehicle 30, based on the direction of travel information 564 included in the control information 560 and the current location information obtained by the current location acquirer 340. The assist with regard to the direction of travel of the vehicle 30 is, for example, steering control by controlling a steering wheel.

The controller 300 provides an assist with regard to the acceleration and deceleration of the vehicle 30, based on the acceleration deceleration information 562 included in the control information 560 and the current location information. The assist with regard to the acceleration and deceleration of the vehicle 30 is, for example, acceleration deceleration control by controlling an accelerator or a brake of the vehicle 30.

A3. Data Structure

Figure 3:
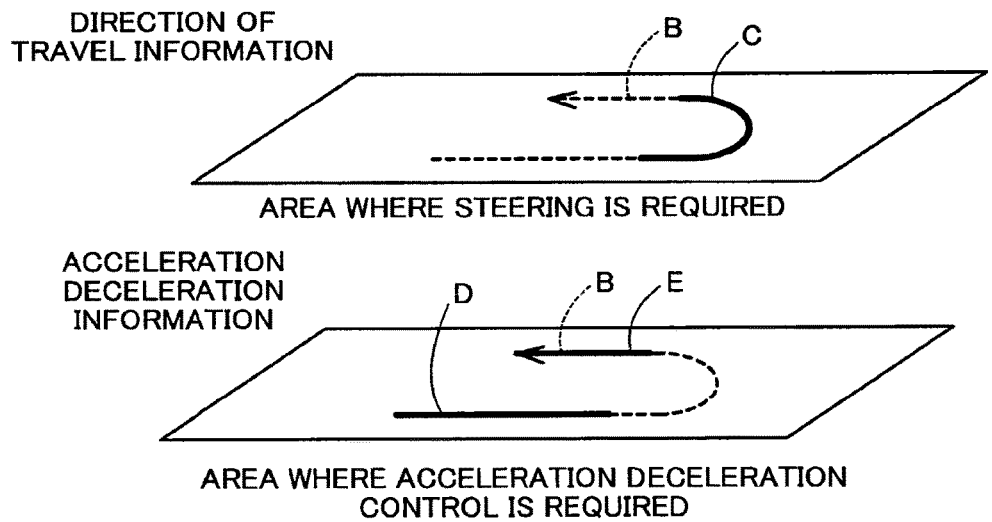
FIG. 3 is a diagram illustrating acceleration deceleration information and direction of travel information.

FIG. 3 is a diagram illustrating the acceleration deceleration information 562 and the direction of travel information 564. The upper drawing of FIG. 3 illustrates the direction of travel information 564, and the lower drawing of FIG. 3 illustrates the acceleration deceleration information 562. The upper drawing and the lower drawing show the same location in the common coordinate system (latitude and longitude), and the direction of travel of the vehicle 30 is the direction of an arrow B. The assist with regard to the direction of travel is required at a curve C, and the assist with regard to the acceleration and deceleration is required at a straight line D immediately before the curve C in the direction of travel and at a straight line E immediately after the curve C in the direction of travel. The direction of travel information 564 includes information for controlling the vehicle 30 in an area of the curve C, and the acceleration deceleration information 562 includes information for controlling the vehicle 30 in areas of the straight line D and the straight line E. More specifically, the direction of travel information 564 includes information for turning the vehicle 30 to the left. The acceleration deceleration information 562 includes information for decelerating the vehicle 30 at the straight line D and information for accelerating the vehicle 30 at the straight line E. For simplicity of explanation, FIG. 3 only illustrates the direction of travel information 564 at the curve C and the acceleration deceleration information 562 at the straight line D and at the straight line E. The acceleration deceleration information 562 and the direction of travel information 564 of the disclosure are, however, not limited to this example. The acceleration deceleration information 562 also includes information indicating no acceleration or deceleration at a location that needs neither acceleration nor deceleration. The direction of travel information 564 includes information indicating travel in a straight line at a location that needs going straight ahead.

Figure 4:
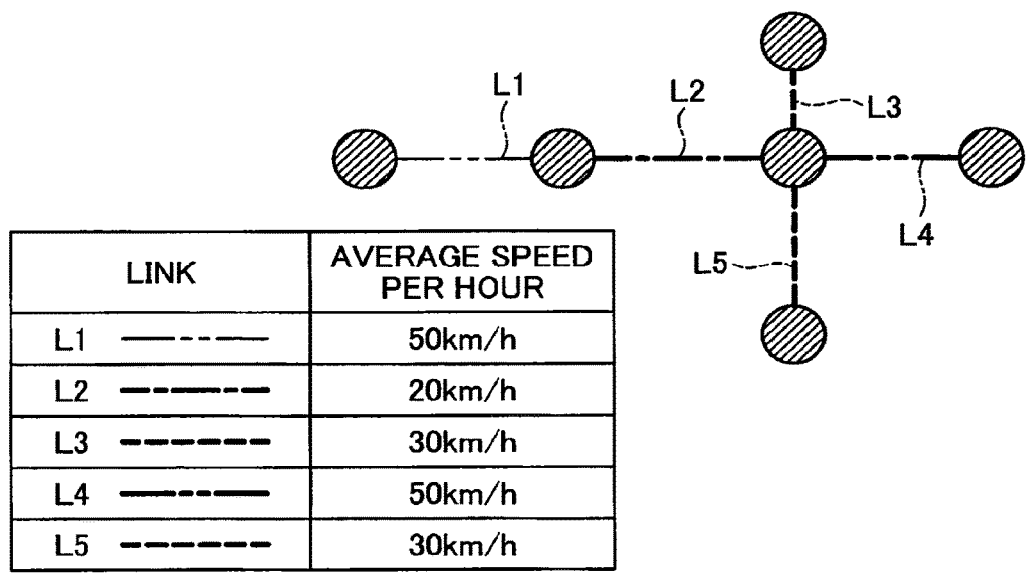
FIG. 4 is a diagram illustrating conventional road network data.

FIG. 4 is a diagram illustrating conventional road network data for route search. The conventional road network data includes a plurality of nodes that respectively represent intersections and a plurality of links that respectively represent roads and are arranged to interconnect the respective nodes. In FIG. 4, each link is related to an average speed per hour. More specifically, in FIG. 4, a link L1 is related to an average speed of 50 km/h, a link L2 is related to an average speed of 20 km/h, a link L3 is related to an average speed of 30 km/h, a link L4 is related to an average speed of 50 km/h and a link L5 is related to an average speed of 30 km/h. The road network data includes information regarding the average speed per hour related to each link and is accordingly used to calculate a route and an arrival time in the case of navigation.

In the case of drive assist based on the conventional road network data, on the other hand, for example, when the vehicle 30 moves from the link L1 to the link L2, the vehicle 30 drives on the link L1 at the average speed of 50 km/h but should drive on the link L2 at the average speed of 20 km/h. This means the speed of the vehicle 30 drastically changes at the node that is the boundary between the link L1 and the link L2. In calculation of the control level for the drive assist using the conventional road network data, the drive assist system is required to perform an arithmetic operation for levelling a rapid change in vehicle speed, so as to prevent a sudden acceleration or deceleration. In the application that the road network data is stored in relation to the information on the average speed per hour, there is a need to calculate and determine a control level indicating the magnitude of control for driving the vehicle at the average speed per hour related to each link.

Figure 5:
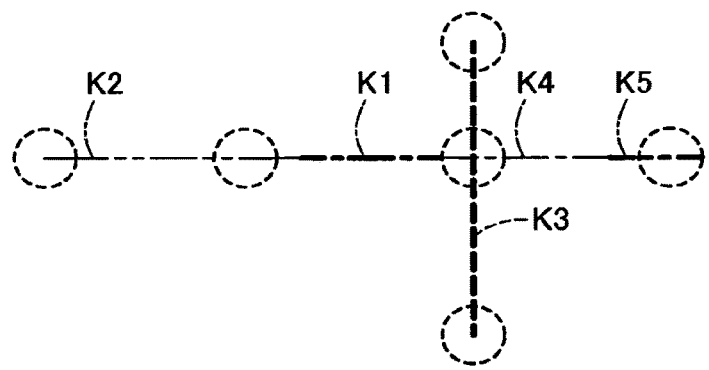
FIG. 5 is a diagram illustrating the acceleration deceleration information according to the embodiment.

FIG. 5 is a diagram illustrating the acceleration deceleration information 562 according to the embodiment. In the road network data for route search, each of the end points of links is generally set to an intersection, a junction or the like. The end points of sections in the acceleration deceleration information 562 may be, however, different from the end points of links but are determined based on the points at which the acceleration of the vehicle 30 is to be changed on the road. The drive assist based on the acceleration deceleration information 562 does not limit the point at which the acceleration or deceleration is to be changed to the intersection or junction, but may be provided according to the shape or the slope of the road. The positions of ordinary nodes are shown by broken-line circles in FIG. 5.

The end points of the sections in the acceleration deceleration information 562 may be set by fine division providing a greater number of end points or by rough division providing a smaller number of end points in rough divisions, compared with the road network data for route search. The dividing method of sections in the acceleration deceleration information 562 is not necessarily limited to one of the fine division providing a greater number of end points and the rough division providing a smaller number of end points but may be changed partly, for example, according to connection of roads.

In application of the rough division providing a smaller number of end points compared with the road network data for route search, there is no need to allocate an identical acceleration deceleration control level to a plurality of consecutive links included in the road network data for router search. This reduces the data volume and thereby reduces the processing load, compared with the road network data for route search.

For example, it is assumed that consecutive links L1 and L2 are included in the road network data for route search. Both the link L1 and the link L2 have an acceleration deceleration control level of +2. The link L1 and the ink L2 have the same acceleration deceleration control level and are thus treated as one section K1 in the acceleration deceleration information 562.

In the case of using the road network data for route search to send the information of the acceleration deceleration control level from the server to the vehicle, there is a need to send the data of the links L1 and L2 and the information of the acceleration deceleration control level related to the respective links. In the case of using the acceleration deceleration information 562, on the other hand, there is only a need to send the data of the section K1 and its acceleration deceleration control level. Using the acceleration deceleration information 562 accordingly reduces the data volume to be sent from the server to the vehicle, compared with using the road network data for route search. Using the acceleration deceleration information 562 also reduces the processing load in the arithmetic processing for vehicle control, because of the same reason.

The acceleration deceleration information 562 includes information indicating the direction of acceleration or deceleration of the vehicle 30. The "direction of acceleration or deceleration" herein denotes the direction of acceleration in the direction of travel of the vehicle. In FIG. 5, each section is related to information regarding the acceleration deceleration control level. In this embodiment, the plus number of the level indicates acceleration, the minus number of the level indicates deceleration, and the level zero indicates no control. Accordingly, the sign of the level is used as information indicating the direction of acceleration. In this embodiment, the degree of acceleration deceleration control increases with an increase in number of the level.

A section K1 is related to a level −2 representing significantly decelerating. A section K2 is related to a level −1 representing slightly decelerating. A section K3 is related to a level 0 representing no control. A section K4 is related to a level +1 representing slightly accelerating. A section K5 is related to a level +2 representing significantly accelerating. The control with respect to acceleration or deceleration can thus be expressed by one piece of information. In the application that speed information, for example, average speed, is related to each section, there is a need to generate control information by calculation based on the speed information and the information of the vehicle (e.g., type of vehicle and engine displacement). This embodiment, however, relates the acceleration deceleration information to each section and accordingly does not need such calculation. This configuration reduces the load of arithmetic processing in the drive assist system, compared with the calculation based on the speed information and the information of the vehicle. Additionally, the drive assist system 10 of the embodiment reduces the load of arithmetic processing, compared with drive assist based on multiple pieces of information, for example, information on the vehicle position obtained from a vehicle-mounted camera and information on the road slope or the road curvature obtained from a gyroscope mounted on the vehicle 30.

Figure 6:
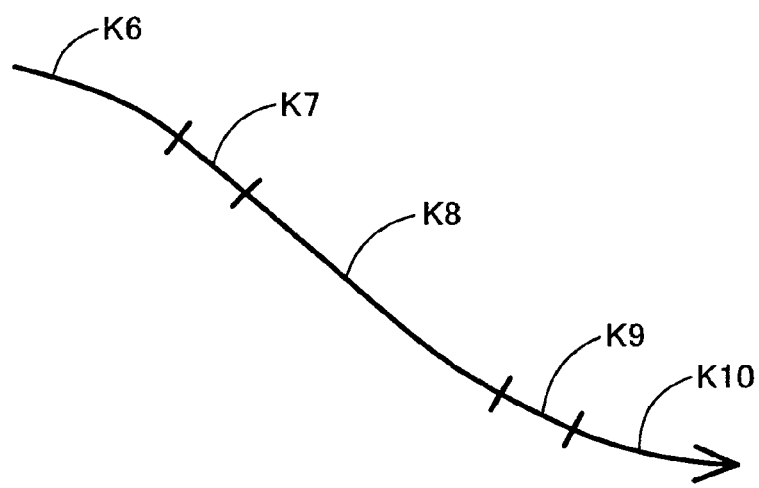
FIG. 6 is a diagram illustrating the direction of travel information according to the embodiment.

FIG. 6 is a diagram illustrating the direction of travel information 564 according to this embodiment. FIG. 6 illustrates the direction of travel information 564 when the vehicle 30 moves from the upper left to the lower right in the drawing. In the road network data for route search, each of the end points of links is generally set to an intersection, a junction or the like. The end points of sections in the direction of travel information 564 may be, however, different from the end points of links but are determined based on the points at which the direction of the vehicle 30 is to be changed on the road. The drive assist based on the direction of travel information 564 does not limit the point at which the direction of the vehicle 30 is to be changed to the intersection or junction, but may be provided according to the shape or the slope of the road.

Like the acceleration deceleration information 562, the end points of the sections in the direction of travel information 564 may be set by fine division providing a greater number of end points or by rough division providing a smaller number of end points in rough divisions, compared with the road network data for route search. The dividing method of sections in the direction of travel information 564 is not necessarily limited to one of the fine division providing a greater number of end points and the rough division providing a smaller number of end points but may be changed partly, for example, according to connection of roads.

The direction of travel information 564 includes information indicating turning to the right or turning to the left relative to the direction of travel of the vehicle 30. In FIG. 6, each section is related to information regarding the control level with respect to the direction of travel. In this embodiment, the plus number of the level indicates turning the vehicle 30 to the left, the minus number of the level indicates turning the vehicle 30 to the right, and the level zero indicates no control. Accordingly, the sign of the level is used as information indicating turning to the right or turning to the left relative to the direction of travel of the vehicle 30. In this embodiment, the degree of direction of level control increases with an increase in number of the level.

A section K6 is related to a level −2 representing changing the direction of the vehicle 30 significantly to the right. A section K7 is related to a level −1 representing changing the direction of the vehicle 30 slightly to the right. A section K8 is related to a level 0 representing no control. A section K9 is related to a level +1 representing changing the direction of the vehicle 30 slightly to the left. A section K10 is related to a level +2 representing changing the direction of the vehicle 30 significantly to the left. The control with respect to the direction of travel of the vehicle 30 can also be expressed by one piece of information. The drive assist system 10 of the embodiment reduces the load of arithmetic processing, compared with the drive assist based on multiple pieces of information.

As described above, the end points of the sections in the control information 560 are different from the end points of the roads corresponding to the links in the road network data for road search. The control information 560 is determined, based on the points where the control of the vehicle 30 is to be changed. The drive assist based on the control information 560 does not limit the point at which the control of the vehicle 30 is to be changed, to the intersection or junction, but may be provided according to the shape or the slope of the road.

Employing the data structure of the first embodiment enables the controller 300 of the vehicle 30 to obtain the control information 560 and use the obtained control information 560 for drive assist. More specifically, employing the data structure of the first embodiment enables the controller 300 of the vehicle 30 to obtain the acceleration deceleration data and the direction of travel data and use the obtained acceleration deceleration data and direction of travel data for drive assist.

Figure 7:
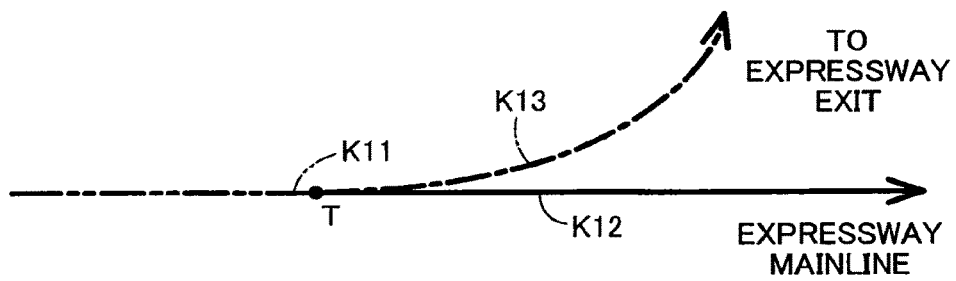
FIG. 7 is a diagram illustrating the case that an identical section has different pieces of the control information.

FIG. 7 is a diagram illustrating the case that an identical section has different pieces of the control information 560. For example, a road with a junction is applied to this case. FIG. 7 illustrates a junction between a road toward an expressway exit and a road in expressway mainline. The vehicle 30 moves from the left side to the right side in the drawing of FIG. 7.

The acceleration deceleration information 562 includes multiple different pieces of information with regard to one identical section for controlling the vehicle 30 with different accelerations or decelerations. More specifically, travel of the vehicle 30 to the road toward the expressway exit and travel of the vehicle 30 to the road in the expressway mainline have different pieces of information to be used for control. The controller 300 selects information to be used for control of the vehicle 30 among multiple different pieces of information, based on at least one of operation information entered to the controller 300 and route information toward a destination, and provides a drive assist using the selected information. The operation information entered to the controller 300 is, for example, the driver's operation of a direction indicator, an accelerator pedal or a brake pedal. The route information toward the destination denotes route information searched by the route searcher 58 based on the user's entry of at least a place of departure and a destination via the input unit 350.

In FIG. 7, in the case of travel of the vehicle 30 to the road toward the expressway exit, a section K11 is related to an acceleration deceleration control level of −2 representing significantly decelerating. In the case of travel of the vehicle 30 to the road in the expressway mainline, on the other hand, the section K11 is related to an acceleration deceleration control level of +1 representing slightly accelerating. The control information 560 may include multiple different pieces of information (control levels) with regard to one identical section for control in different levels according to the direction of travel and the route. The controller 300 selects the acceleration deceleration information to be used for control of the vehicle and provides a drive assist using the selected information.

Similarly, the direction of travel information 564 includes multiple different pieces of information with regard to one identical section for controlling the vehicle 30 with different directions of travel. In FIG. 7, in the case of travel of the vehicle 30 to the road in the expressway mainline, both sections K11 and K12 are related to a level 0 representing no control. In the case of travel of the vehicle 30 to the road toward the expressway exit, on the other hand, for a late change, the section K11 is related to a level +1 representing changing the direction of the vehicle 30 slightly to the left, and a subsequent section K13 is related to a level +2 representing changing the direction of the vehicle 30 significantly to the left. The control information 560 may include multiple different pieces of information (control levels) with regard to one identical section for control in different levels according to the direction of travel and the route. The controller 300 selects the direction of travel information to be used for control of the vehicle and provides a drive assist using the selected information.

As described above, the control information 560 includes multiple different pieces of information with regard to one identical section for different controls of the vehicle 30. The controller 300 selects information to be used for control of the vehicle 30 among the multiple different pieces of information, based on at least one of the operation information entered to the vehicle 30 and the route information toward the destination, and provides a drive assist using the selected information.

B. Second Embodiment

FIG. 8 is a diagram illustrating acceleration deceleration information 662 according to a second embodiment. Control information 660 of the second embodiment differs from the control information 560 of the first embodiment by using conventional road network data for route search, but is otherwise similar to the control information 560 of the first embodiment. A link between a node N1 and a node N2 is expressed as a link L1. A link between the node N2 and a node N3 is expressed as a link L2. A link between the node N3 and a node N4 is expressed as a link L3. A link between the node N3 and a node N5 is expressed as a link L5. A link between the node N3 and a node N6 is expressed as a link L4.

The link L1 and a portion of the link L2 within 100 m from the node N2 are related to a level −1 representing slightly decelerating. A remaining portion of the link L2 within 400 m from the node N3 is related to a level −2 representing significantly decelerating. The link L3 and the link L5 are related to a level 0 representing no control. A portion of the link L4 within 200 m from the node N3 is related to a level +1 representing slightly accelerating. A remaining portion of the link L4 within 200 m from the node N6 is related to a level +2 representing significantly accelerating.

The acceleration deceleration information 662 may be added to the conventional road network data. Similarly, direction of travel information 664 may be added to the conventional road network data. More specifically, the acceleration deceleration information 662 and the direction of travel information 664 or the control information 660 may be provided as separate data from the road network data for route search as shown in FIG. 5 or FIG. 6 of the first embodiment or may be provided in combination with the road network data for route search like this embodiment. In other words, the requirement is that end points of sections in the acceleration deceleration information 662 and the direction of travel information 664 or in the control information 660 are different from end points of sections of road corresponding to links of road network data for route search but are determined based on the points where the control of the vehicle is to be changed.

Figure 9:
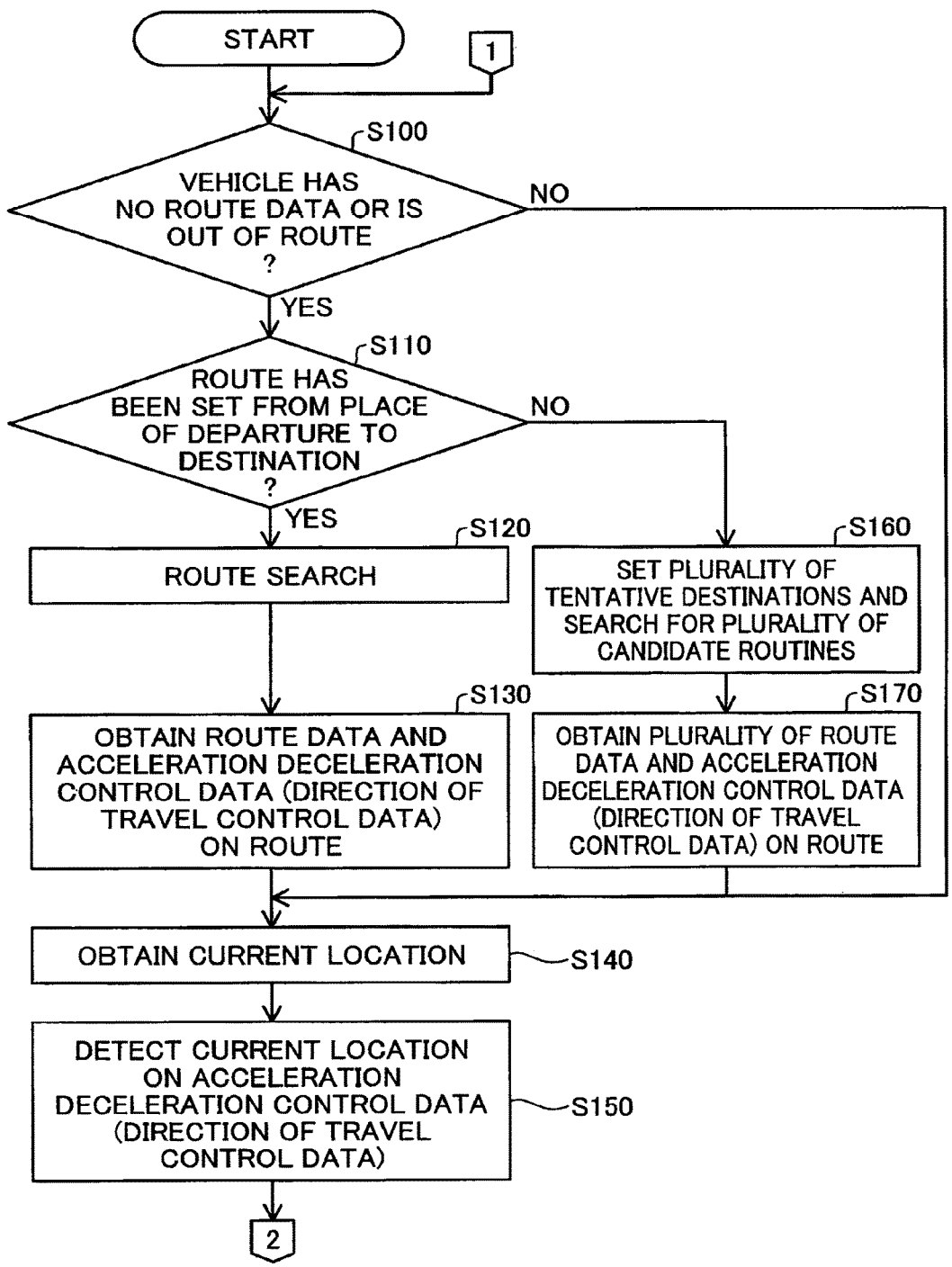
FIG. 9 is a flowchart showing a processing flow of the second embodiment.

FIG. 9 is a flowchart showing a processing flow of the second embodiment. At step S100, the controller 300 of the vehicle 30 determines whether the vehicle 30 has no route data or the vehicle 30 is out of route. According to this embodiment, the state that the vehicle has no route data is one of the following cases: (i) the vehicle does not perform route search: (ii) when a plurality of routes are set in a predetermined range, the vehicle is likely to go beyond the predetermined range; and (iii) the vehicle is out of a candidate route. The case (ii) that the vehicle is likely to go beyond the predetermined range when a plurality of routes are set in the predetermined range means that the vehicle is approaching a tentative destination on the route. The tentative destination is described later in detail. Determining whether the vehicle is out of route denotes determining whether the current location obtained by the current location acquirer 340 is away from the route by a predetermined distance.

When the controller 300 determines that the vehicle 30 has no route data or the vehicle 30 is out of route (step S100: NO), the flow proceeds to step S140. When the controller 300 determines that the vehicle 30 has route data and is not out of route (step S100: YES), on the other hand, the controller 300 subsequently determines whether a route has been set from a place of departure to a destination at step S110.

When the controller 300 determines that a route has already been set (step S110: YES), the controller 300 performs route search at step S120. More specifically, the controller 300 gives a request for route data to the server 50 via the vehicle communicator 310. The route searcher 58 of the server 50 generates route data in response to the given request and sends the generated route data to the vehicle 30 via the server communicator 52.

At step S130, the controller 300 obtains the route data and acceleration deceleration control data (direction of travel control data) on the route. The acceleration deceleration control data (direction of travel control data) herein denotes at least one of the acceleration deceleration control data and the direction of travel control data.

Subsequently, the controller 300 controls the current location acquirer 340 to obtain the current location at step S140, and detects the current location on the acceleration deceleration control data (direction of travel control data) at step S150. The flow then proceeds to step S200 (shown in FIG. 10).

When the controller 300 determines that no route has been set yet (step S110: NO), on the other hand, the controller 300 sets a plurality of tentative destinations and searches for a plurality of candidate routes at step S160.

The following describes the tentative destinations. In the application of the drive assist system of the first embodiment and/or the second embodiment without setting a route from a place of departure to a destination, it is impossible to specify the ranges of the acceleration deceleration data, the direction of travel data and the road NW data to be read for drive assist, due to the absence of a preset data. Even in the case that no route has been set from a place of departure to a destination, setting a plurality of tentative destinations around the current location and searching for a plurality of candidate routes makes the drive assist system of the first embodiment and/or the second embodiment available.

Figure 12A:
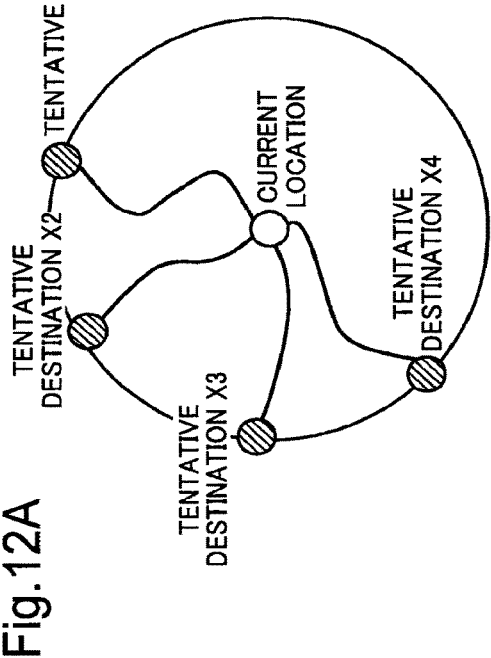
FIGS. 12A to 12C are diagrams illustrating a method of setting tentative destinations.
Figure 12B:
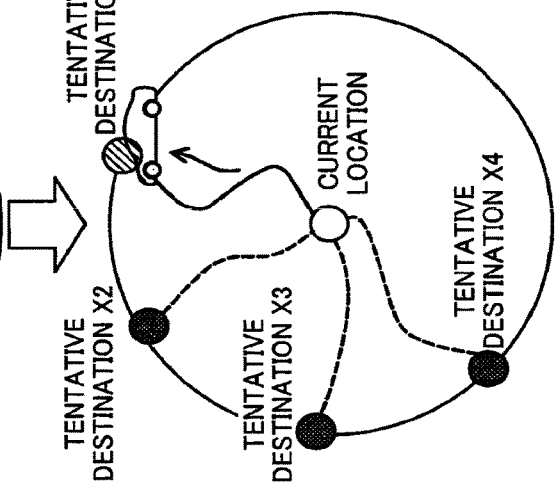
Figure 12C:
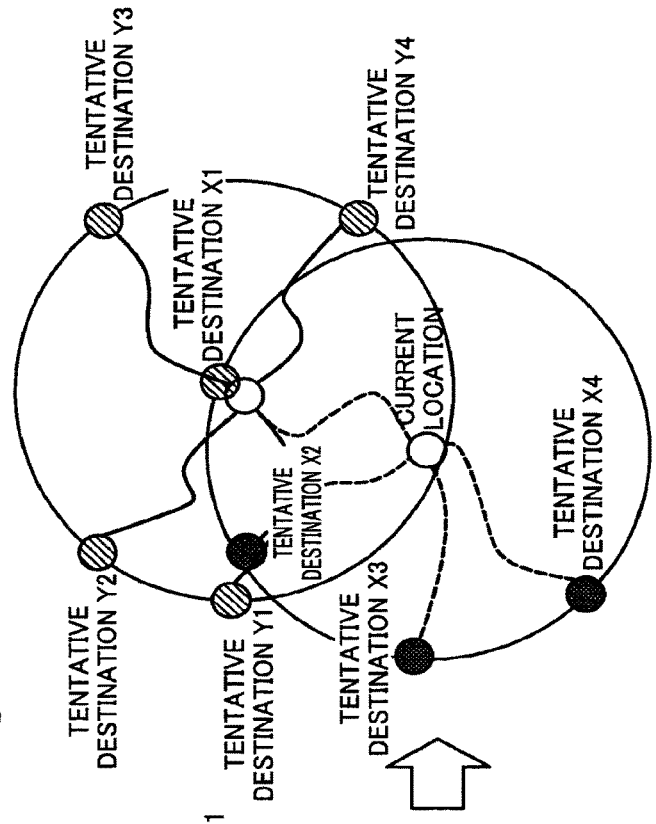

FIGS. 12A to 12C are diagrams illustrating a method of setting tentative destinations. Specifically, the controller 300 first controls the current location acquirer 340 to obtain the current location. The controller 300 subsequently sends the information on the current location to the server 50 via the vehicle communicator 310. The route searcher 58 of the server 50 then sets a plurality of destinations placed on a concentric circle about the current location as tentative destinations and performs route search. The route searcher 58 of the server 50 may search for a route thoroughly going round the surrounding of the current location, instead of this method of route search. The positions at which tentative destinations are set are not limited to the positions on a concentric circle about the current location but may be any positions at which a plurality of tentative destinations are settable. For example, one available method may set a polygonal area and set the apexes of the polygonal area as tentative destinations. Another available method may set a specified type of buildings within a predetermined range about the current location as tentative destinations.

FIG. 12A is a diagram illustrating the state that a plurality of destinations on a concentric circle about the current location are set as tentative destinations X1, X2, X3 and X4. FIG. 12B is a diagram illustrating the state that the vehicle 30 is moved to a new current location near the tentative destination X1. FIG. 12C is a diagram illustrating the state that a plurality of destinations on a concentric circle about the new current location after the travel of the vehicle 30 are set as new tentative destinations Y1, Y2, Y3 and Y4. At step S160 (shown in FIG. 9), the controller 300 sets a plurality of tentative destinations associated with the current location and searches for a plurality of candidate routes.

After setting the plurality of tentative destinations and searching for the plurality of candidate routes (step S160), the controller 300 obtains a plurality of route data and acceleration deceleration control data (direction of travel control data 9 on the respective routes at step S170. After the processing of step S170, the flow proceeds to step S140.

Figure 10:
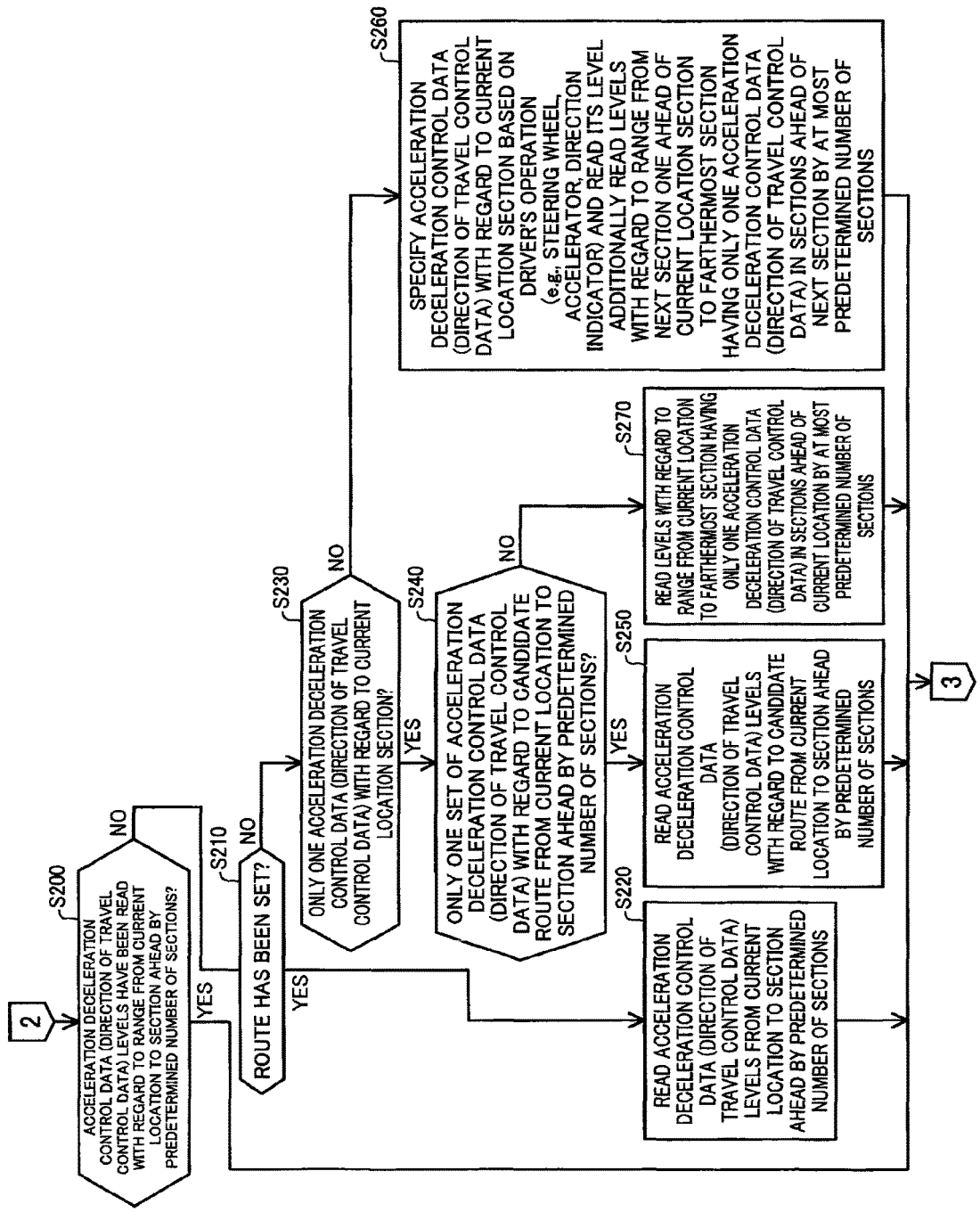
FIG. 10 is a flowchart showing the processing flow of the second embodiment.

FIG. 10 is a flowchart showing the processing routine of and after step S200. After the processing of step S150, the controller 300 determines whether acceleration deceleration control data (direction of travel control data) levels have been read with regard to a range from the current location to a section ahead of the current location by a predetermined number of sections at step S200. When the acceleration deceleration control data (direction of travel control data) levels have already been read with regard to the range from the current location to the section ahead of the current location by the predetermined number of sections (step S200: YES), the flow proceeds to step S400 (shown in FIG. 11).

When the acceleration deceleration control data (direction of travel control data) levels have not yet been read with regard to the range from the current location to the section ahead of the current location by the predetermined number of sections (step S200: NO), on the other hand, the controller 300 subsequently determines whether a route has been set at step S210.

When a route has been set (step S210: YES), the controller 300 reads the acceleration deceleration control data (direction of travel control data) levels from the current location to the section ahead of the current location by the predetermined number of sections at step S220. The flow then proceeds to step S400 (shown in FIG. 11).

When no route has been set yet (step S210: NO), on the other hand, the controller 300 determines whether there is only one acceleration deceleration control data (direction of travel control data) with regard to a current location section (current location) at step S230. When there is only one acceleration deceleration control data (direction of travel control data) with regard to the current location section (step S230: YES), the controller 300 subsequently determines whether there is only one set of acceleration deceleration control data (direction of travel control data) with regard to a candidate route from the current location to a section ahead of the current location by a predetermined number of sections at step S240.

Figure 13:
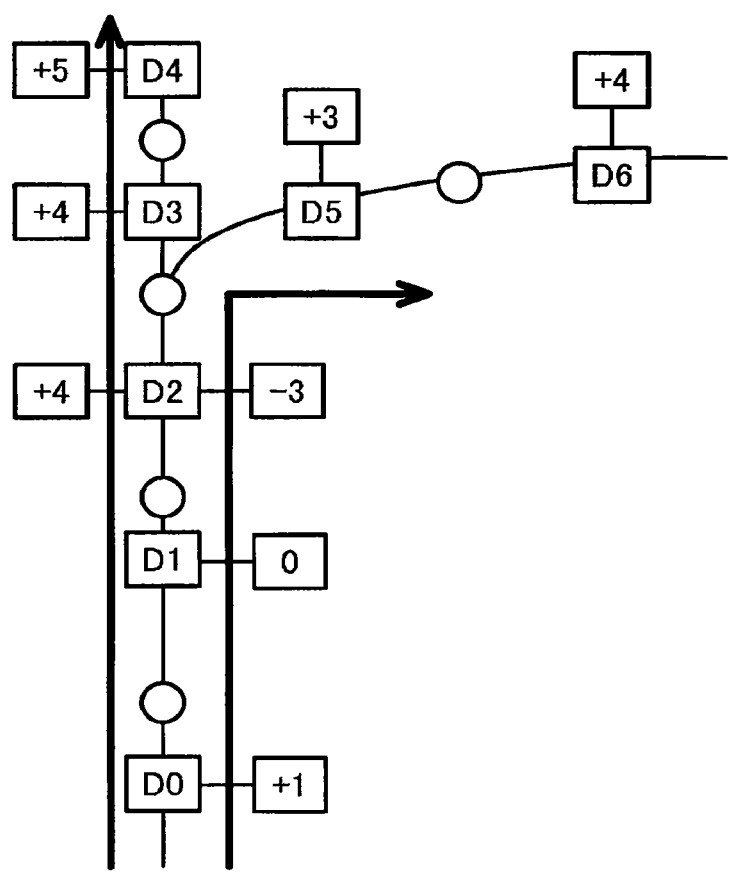
FIG. 13 is a diagram illustrating a method of determining whether there is only one set of acceleration deceleration control data (direction of travel control data) with regard to a candidate route from a current location to a section ahead of the current location by a predetermined number of sections.

FIG. 13 is a diagram illustrating a method of determining whether there is only one set of acceleration deceleration control data (direction of travel control data) with regard to the candidate route from the current location to the section ahead of the current location by the predetermined number of sections. In the illustrated example of FIG. 13, sections D0 to D6 are respectively related to acceleration deceleration control data. End points of each section do not correspond to nodes for route search but are set at positions where acceleration deceleration control is changed. In other words, the end points of each section indicate positions of each division of the acceleration deceleration control data.

In FIG. 13, the section D0 is related to an acceleration deceleration control data level of +1. The section D1 is related to an acceleration deceleration control data level of 0. The section D3 is related to an acceleration deceleration control data level of +4. The section D4 is related to an acceleration deceleration control data level of +5. The section D5 is related to an acceleration deceleration control data level of +3. The section D6 is related to an acceleration deceleration control data level of +4. The section D2 is, however, related to acceleration deceleration control data levels of +2 and −3. Relating a plurality of acceleration deceleration control data levels to the section D2 is attributed to different acceleration deceleration controls of the vehicle 30 when the vehicle 30 goes to the section D3 and when the vehicle 30 goes to the section D5.

For example, in FIG. 13, it is assumed that the current location section is the section D0 and that the predetermined number of sections at step S240 is one section. In this case, it is determined at step S230 that there is only one acceleration deceleration control data with regard to the current location section. The acceleration deceleration control data with regard to a candidate route from the current location section to the section ahead of the current location section by the predetermined number of sections is accordingly acceleration deceleration control data with regard to a candidate route from the section D0 to the section D1. Each of these sections is related to only one acceleration deceleration control data level. It is accordingly determined at step S240 that there is only one set of acceleration deceleration control data with regard to the candidate route from the current location section to the section ahead of the current location section by the predetermined number of sections.

In another example, in FIG. 13, it is assumed that the current location section is the section D1 and that the predetermined number of sections at step S240 is one section. In this case, the acceleration deceleration control data with regard to a candidate route from the current location section to the section ahead of the current location section by the predetermined number of sections is accordingly acceleration deceleration control data with regard to a candidate route from the section D1 to the section D2. The section D2 is related to two different acceleration deceleration control data levels. It is accordingly determined at step S240 that there is not only one set of acceleration deceleration control data with regard to the candidate route from the current location section to the section ahead of the current location section by the predetermined number of sections.

When the controller 300 determines at step S240 (shown in FIG. 10) that there is only one set of acceleration deceleration control data (direction of travel control data) with regard to the candidate route from the current location to the section ahead of the current location by the predetermined number of sections (step S240: YES), the controller 300 reads acceleration deceleration control data (direction of travel control data) levels with regard to the candidate route from the current location to the section ahead of the current location by the predetermined number of sections at step S250. The flow subsequently proceeds to step S400 (shown in FIG. 11).

When it is determined at step S230 that there is not only one acceleration deceleration control data (direction of travel control data) with regard to the current location section (step S230: NO), on the other hand, the controller 300 specifies acceleration deceleration control data (direction of travel control data) with regard to the current location section based on the driver's operation and reads its acceleration deceleration control data (direction of travel control data) level at step S260. The driver's operation is, for example, an operation of the steering wheel, an operation of the accelerator, or an acceleration of a direction indicator. Additionally, at step S260, the controller 300 reads acceleration deceleration control data (direction of travel control data) levels with regard to a range from a next section one ahead of the current location section to a farthermost section having only one acceleration deceleration control data (direction of travel control data) in sections ahead of the next section by at most the predetermined number of sections. The flow subsequently proceeds to step S400 (shown in FIG. 11).

When the controller 300 determines at step S240 that there is not only one set of acceleration deceleration control data (direction of travel control data) with regard to the candidate route from the current location to the section ahead of the current location by the predetermined number of sections (step S240: NO), the controller 300 reads acceleration deceleration control data (direction of travel control data) levels with regard to a range from the current location to a farthermost section having only one acceleration deceleration control data (direction of travel control data) in sections ahead of the current section by at most the predetermined number of sections at step S270. The flow subsequently proceeds to step S400 (shown in FIG. 11).

Figure 11:
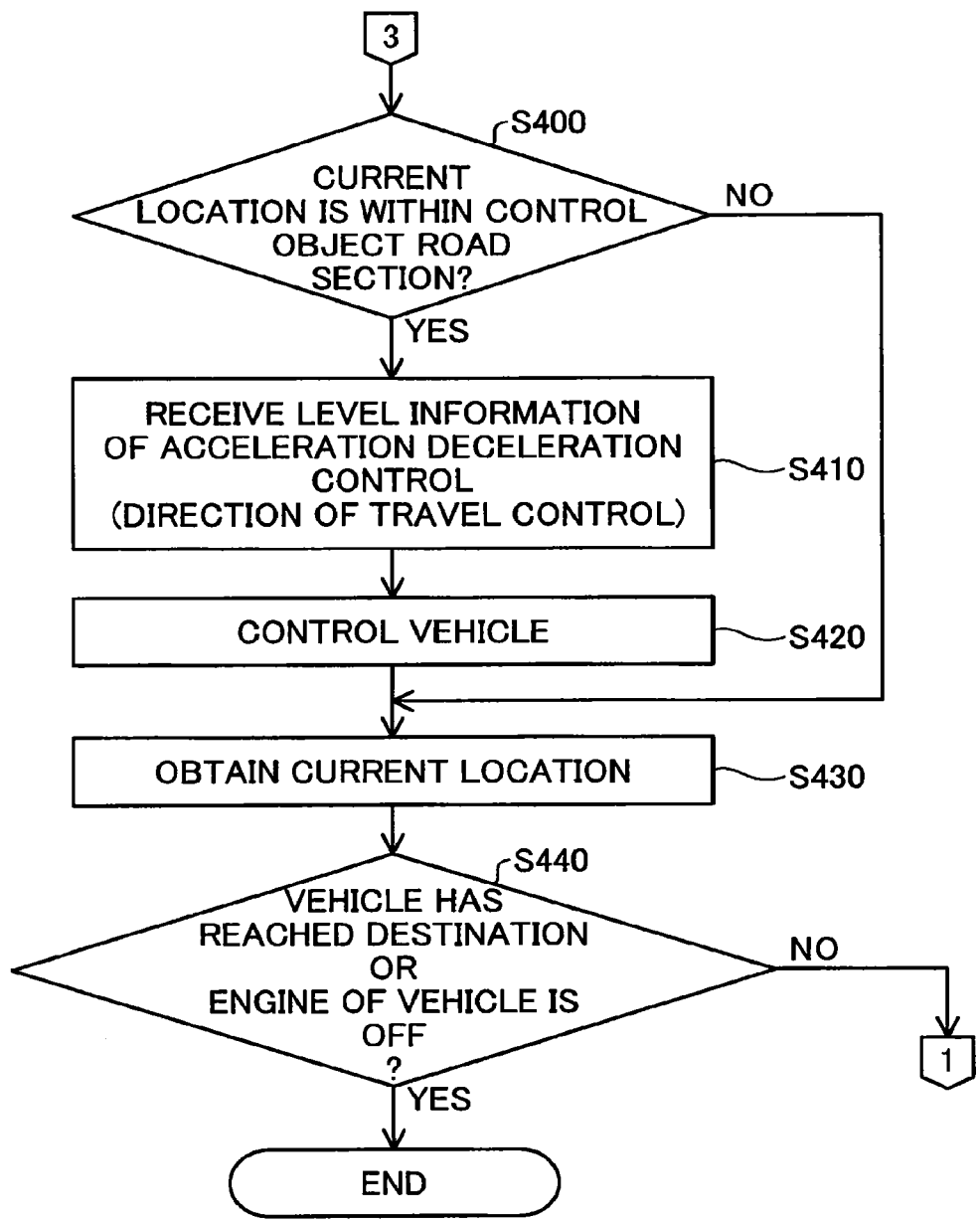
FIG. 11 is a flowchart showing the processing flow of the second embodiment.

FIG. 11 is a flowchart showing the processing flow of and after step S400. At step S400, the controller 300 determines whether the current location is within a control object road section. When the current location is within the control object road section (step S400: YES), the controller 300 receives level information of acceleration deceleration control (direction of travel control) at step S410 and controls the vehicle 30 based on the received level information at step S420. The controller 300 subsequently controls the current location acquirer 340 to obtain the current location at step S430. When the current location is out of the control object road section (step S400: NO), on the other hand, the flow proceeds to step S430.

After obtaining the current location at step S430, the controller 300 determines whether the vehicle 30 has reached the destination or the engine of the vehicle 30 is off at step S440. When the vehicle 30 has not yet reached the destination and the engine of the vehicle 30 is not off (step S440: NO), the flow returns to step S100 (shown in FIG. 9). When the vehicle 30 has reached the destination or when the engine of the vehicle 30 is off (step S440: YES), the processing flow is terminated.

C. Modifications

The disclosure is not limited to the embodiments described above but may be implemented by a diversity of other aspects without departing from the scope of the disclosure. Some examples of possible modifications are given below.

C1. Modification 1

In the above embodiment, the control information 560 is information provided in relation to each of a plurality of sections of the road. Another method of relating the control information 560 to the plurality of sections of the road may relate the control information 560 to features on the road. The features herein denote any objects on the ground and include, for example, power poles, buildings, trees, traffic lights and signs.

For example, it is assumed that power poles are used as such features. Control information P1 between a feature E1 and a feature E2 is related to the feature E1. Control information P2 between the feature E2 and a feature E3 is related to the feature E2. Control information P3 between the feature E3 and a feature E4 is related to the feature E3. This aspect also provides information related to each of the plurality of sections of the road.

C2. Modification 2

In the above embodiment, when the vehicle 30 goes straight ahead, the direction of travel information 564 is information representing no control. The disclosure is, however, not limited to this configuration.

It is assumed that the vehicle 30 runs on a sloped road and that the road on which the vehicle 30 runs is sloped such that the left side is lower than the right side relative to the direction of travel. In this case, the driver requires to turn the steering wheel slightly to the right even when the vehicle 30 goes straight ahead. In order to make the vehicle 30 go straight ahead, a level −1 representing changing the direction of the vehicle 30 slightly to the right is related as the direction of travel information to this road section.

C3. Modification 3

In the above embodiments, the controller 300 of the vehicle 30 may additionally notify the driver of current or future drive assist information in the form of voice, light or vibration.

C4. Modification 4

In the above embodiment, the acceleration deceleration information 562 includes information regarding the level of acceleration deceleration control. The disclosure is, however, not limited to this configuration. For example, the acceleration deceleration information 562 may include speed per hour information, instead of the information regarding the control level. The speed per hour information may not be necessarily related to a road section by one-to-one mapping. For example, 30 km/h is related to a road section A, 30 km/h to 50 km/h is related to a road section B, and 50 km/h is related to a road section C. Like this example, information indicating accelerating in a certain road section may be related as the speed per hour information to the road section.

C5. Modification 5

In the above embodiment, the direction of travel information 564 includes information regarding the level of direction of travel control. The disclosure is, however, not limited to this configuration. For example, the direction of travel information 564 may include information regarding a radius of curve or may include information regarding an angle between the forward direction of the vehicle and the direction of travel of the vehicle, instead of the information regarding the control level. In another example, the direction of travel information 564 may include information regarding the angular velocity of rotation of the steering wheel, instead of the information regarding the control level. For example, data $\omega_1$ rad/s is stored in advance for control of gradually turning to the left in a long road section, and data $\omega_2$ rad/s is stored in advance for control of abruptly turning to the left in a short road section, where $\omega_1 < \omega_2$. The configuration using such data structure stores in advance data specifying whether a steering operation of the steering wheel is to be performed abruptly and accordingly reduces the load of arithmetic processing for vehicle control. In the above embodiment, the control information 560 is configured to include the acceleration deceleration information 562 and the direction of travel information 564. The disclosure is, however, not limited to this configuration. The control information 560 may be configured to include only speed information regarding, for example, the average speed. When the control information includes the information regarding the radius of curve, the information regarding the angle between the forward direction of the vehicle and the direction of travel of the vehicle, or the speed information, the controller 300 may perform an adequate arithmetic operation based on such information and convert the result of the arithmetic operation to information regarding the level of the direction of travel control or the acceleration deceleration information. As described above, the control information 560 of the disclosure is not limited to the configuration including the acceleration deceleration information 562 and the direction of travel information 564 but may be any control information usable for controlling travel of the vehicle.

C6. Modification 6

In the above embodiment, the controller 300 provides a drive assist with regard to the acceleration and deceleration of the vehicle 30 and a drive assist with regard to the direction of travel of the vehicle 30. The disclosure is, however, not limited to this configuration. The controller 300 may provide at least one of the drive assist with regard to the acceleration and deceleration of the vehicle 30 and the drive assist with regard to the direction of travel of the vehicle 30. In other words, the control information 560 may include at least one of the acceleration deceleration information 562 and the direction of travel information 564. The controller 300 of the vehicle 30 may obtain at least one of the acceleration deceleration information and the direction of travel information and use the obtained at least one of the acceleration deceleration information and the direction of travel information for drive assist.

C7. Modification 7

In the above embodiment, the control information 560 includes one type of the acceleration deceleration information 562 and one type of the direction of travel information 564. The disclosure is, however, not limited to this configuration. The database 56 may store a plurality of different types of the acceleration deceleration information 562 or a plurality of different types of the direction of travel information 564. For example, the vehicle 30 has different power outputs according to its engine displacement, so that a plurality of different types of acceleration deceleration information 562 may be provided according to different engine displacements of the vehicle 30. In another example, the vehicle 30 has different degrees of steering operation according to the vehicle type, so that a plurality of different types of direction of travel information 564 may be provided according to different types of the vehicle 30.

C8. Modification 8

In the above embodiment, the drive assist system 10 is configured to have the vehicle 30 and the server 50 that makes communication with each other. The disclosure is, however, not limited to this configuration. The drive assist system 10 may be configured such that the database 56 is included in the vehicle 30 and is controlled by the controller 300.

C9. Modification 9

In the above embodiment, the locations having different pieces of control information are regarded as different points. The disclosure is, however, not limited to this configuration. The locations having different pieces of control information may be regarded as different areas having certain widths. The configuration using such data structure provides the locations in which the control level is to be changed with some widths and thereby allows for vehicle control without making the driver feel uncomfortable.

In the above embodiment, the controller 300 loads and performs the control program stored in the ROM on the RAM, so as to control the respective components of the vehicle 30. Alternatively, controlling the respective components of the vehicle 30 may be implemented by a circuit configuration.

For example, according to one aspect of the disclosure, there is provided a drive assist system configured to assist driving a vehicle. The drive assist system comprises an information acquirer configured to obtain information including at least one of acceleration deceleration information and direction of travel information from a database that stores at least one of the acceleration deceleration information provided in relation to each of a plurality of sections of a road and used for control with regard to acceleration and deceleration of the vehicle and the direction of travel information provided in relation to each of the plurality of sections of the road and used for control with regard to a direction of travel of the vehicle; a current location acquirer configured to obtain current location information of the vehicle; and a controller configured to provide at least one of a drive assist with regard to the acceleration and deceleration of the vehicle based on the current location information and the acceleration deceleration information and a drive assist with regard to the direction of travel of the vehicle based on the current location information and the direction of travel information. The drive assist system of this aspect reduces the load of arithmetic processing for drive assist, compared with a configuration that provides a drive assist based on shape data and slope data of roads included in conventional map data.

In the drive assist system of the above aspect, an end point of each of the sections in the acceleration deceleration information may be determined based on a point at which an acceleration of the vehicle is to be changed on the road. In the map data, each of end points of links is generally set to an intersection, a junction or the like. The end point of each of the sections in the acceleration deceleration information is, however, determined based on the point at which the acceleration of the vehicle is to be changed on the road. The drive assist system of this aspect does not limit the point at which the acceleration of the vehicle is to be changed to the intersection, the junction or the like but provides a drive assist according to the shape or the slope of the road.

In the drive assist system of the above aspect, an end point of each of the sections in the direction of travel information may be determined based on a point at which a direction of the vehicle is to be changed on the road. In the map data, each of end points of links is generally set to an intersection, a junction or the like. The end point of each of the sections in the direction of travel information is, however, determined based on the point at which the direction of the vehicle is to be changed on the road. The drive assist system of this aspect does not limit the point at which the direction of the vehicle is to be changed to the intersection, the junction or the like but provides a drive assist according to the shape or the slope of the road.

In the drive assist system of the above aspect, the acceleration deceleration information may include information indicating a direction of acceleration in the vehicle. The drive assist system of this aspect reduces the load of the arithmetic processing.

In the drive assist system of the above aspect, the direction of travel information may include information indicating turning to right or turning to left relative to the direction of travel of the vehicle. The drive assist system of this aspect reduces the load of the arithmetic processing.

In the drive assist system of the above aspect, the acceleration deceleration information may include multiple pieces of information that are related to one identical section and are used for different controls with regard to the acceleration and deceleration of the vehicle, and the controller selects information to be used for control of the vehicle among the multiple pieces of information, based on at least one of operation information of the vehicle and route information toward a destination. The drive assist system of this aspect selects information with regard to the acceleration and deceleration to be used for control of the vehicle, based on at least one of the operation information of the vehicle and the route information toward the destination, and provides a drive assist based on the selected information.

In the drive assist system of the above aspect, the direction of travel information may include multiple pieces of information that are related to one identical section and are used for different controls with regard to the direction of travel of the vehicle, and the controller selects information to be used for control of the vehicle among the multiple pieces of information, based on at least one of operation information of the vehicle and route information toward a destination. The drive assist system of this aspect selects information with regard to the direction of travel to be used for control of the vehicle, based on at least one of the operation information of the vehicle and the route information toward the destination, and provides a drive assist based on the selected information.

According to another aspect of the disclosure, there is provided a drive assist system configured to assist driving a vehicle. The drive assist system comprises an information acquirer configured to obtain information including control information from a database that stores the control information provided in relation to each of a plurality of sections of a road and used to control travel of the vehicle; a current location acquirer configured to obtain current location information of the vehicle; and a controller configured to provide a drive assist with regard to travel of the vehicle, based on the current location information and the control information, wherein an end point of each of the sections in the control information is different from an end point of a road section corresponding to a link in road network data for route search but is determined based on a point at which control of the vehicle is to be changed. The drive assist system of this aspect does not limit the point at which the control of the vehicle is to be changed to the intersection, the junction or the like but provides a drive assist according to the shape or the slope of the road.

In the drive assist system of the above aspect, the control information may include multiple pieces of information provided in relation to one identical section and used for different controls of the vehicle, and the controller selects information to be used for control of the vehicle among the multiple pieces of information, based on at least one of operation information of the vehicle and route information toward a destination. The drive assist system of this aspect selects information to be used for control of the vehicle, based on at least one of the operation information of the vehicle and the route information toward the destination, and provides a drive assist based on the selected information.

According to another aspect of the disclosure, there is provided a data structure of road network data used for drive assist of a vehicle. The data structure of the road network data includes at least one of acceleration deceleration information provided in relation to each of a plurality of sections of a road and used for control with regard to acceleration and deceleration of the vehicle and direction of travel information provided in relation to each of the plurality of sections of the road and used for control with regard to a direction of travel of the vehicle. The data structure of the road network data is stored in a computer readable storage medium. Using the data structure of this aspect enables the drive assist system to obtain at least one of the acceleration deceleration data and the direction of travel data and use the obtained at least one of the acceleration deceleration data and the direction of travel data for drive assist.

According to another aspect of the disclosure, there is provided a data structure of road network data used for drive assist of a vehicle. The data structure of the road network data includes control data provided in relation to each of a plurality of sections of a road and used to control travel of the vehicle, wherein an end point of each of the sections in the control information is different from an end point of a road section corresponding to a link in road network data for route search but is determined based on a point at which control of the vehicle is to be changed. The data structure of the road network data being stored in a computer readable storage medium. Using the data structure of this aspect enables the drive assist system to obtain the control data and use the obtained control data for drive assist.

The invention claimed is:

1. A drive assist system, comprising:
circuitry configured to:
obtain information including at least one of acceleration/deceleration information and direction-of-travel information from a memory that stores at least one of the acceleration/deceleration information provided in relation to at least one of a set of a plurality of sections of a road and the direction-of-travel information provided in relation to at least one of the set of the plurality of sections of the road, the acceleration/deceleration information including a plurality of different pieces of acceleration/deceleration information including first acceleration/deceleration information and second acceleration/deceleration information with regard to one identical section of the plurality of sections of the road, the direction-of-travel information including a plurality of different pieces of direction-of-travel information including first direction-of-travel information and second direction-of-travel information with regard to the one identical section of the plurality of sections of the road;

obtain location information of a vehicle; and perform at least one of an acceleration/deceleration drive assist with regard to acceleration and/or deceleration of the vehicle based on the location information and the acceleration/deceleration information, and a direction drive assist with regard to a direction of travel of the vehicle based on the location information and the direction-of-travel information, wherein the circuitry is configured to use at least one of the first acceleration/deceleration information and the first direction-of-travel information in response to the circuitry recognizing a current section of the road that is presently ahead of the vehicle in a current direction-of-travel of the vehicle is a section of the road that is in an expressway mainline, and the circuitry is configured to use at least one of the second acceleration/deceleration information and the second direction-of-travel information in response to the circuitry recognizing the current section of the road that is presently ahead of the vehicle in the current direction-of-travel of the vehicle is a section of the road that is oriented toward an expressway exit.

2. The drive assist system according to claim 1, wherein an end point of the at least one of the set of the plurality of the sections in the acceleration/deceleration information is determined based on a point at which an acceleration of the vehicle is to be changed on the road.

3. The drive assist system according to claim 1, wherein the acceleration/deceleration information includes information indicating a direction of acceleration in the vehicle.

4. The drive assist system according to claim 1, wherein the plurality of sections of the road for the acceleration/deceleration information and the plurality of sections of the road for the direction-of-travel information are the same.

5. The drive assist system according to claim 1, wherein the memory is located in a server or the circuitry.

6. The drive assist system according to claim 1, wherein the plurality of sections of the road relate at least one of the acceleration/deceleration information and the direction-of-travel information to features on the road including at least one of power poles, buildings, trees, traffic lights and signs.

7. The drive assist system according to claim 1, wherein an end point of the at least one of the set of the plurality of the sections in the acceleration/deceleration information and/or the direction-of-travel information is different from an end point of a road section corresponding to a link in road network data for route search.

8. The drive assist system according to claim 1, wherein the circuitry is configured to:

calculate a route to a destination; and obtain the information including at least one of the acceleration/deceleration information and the direction-of-travel information from the memory based on the route.

9. The drive assist system according to claim 1, wherein the circuitry is configured to:

obtain current location information of the vehicle;

calculate a route from the current location to a tentative destination around the current location; and obtain the information including at least one of the acceleration/deceleration information and the direction-of-travel information from the memory based on the route.

10. The drive assist system according to claim 1, wherein the acceleration/deceleration information includes at least one of control level information and speed per hour information.

11. The drive assist system according to claim 1, wherein the circuitry is configured to identify whether the section of the road ahead of the vehicle in the current direction-of-travel of the vehicle is the road in the expressway mainline or the section of the road that is oriented toward an expressway exit based on operation information entered to the circuitry.

12. The drive assist system according to claim 1, wherein the circuitry is configured to identify whether the section of the road ahead of the vehicle in the current direction-of-travel of the vehicle is the road in the expressway mainline or the section of the road that is oriented toward an expressway exit based on route information toward a destination of the vehicle.

13. The drive assist system according to claim 1, wherein the first acceleration/deceleration information indicates acceleration, and the second acceleration/deceleration information indicates deceleration.

14. The drive assist system according to claim 1, wherein the first direction-of-travel information indicates no control of direction, and the second direction-of-travel information indicates turning to either left or right.

15. A drive assist system, comprising:

circuitry configured to:

obtain information including at least one of acceleration/deceleration information and direction-of-travel information from a memory that stores at least one of the acceleration/deceleration information provided in relation to at least one of a set of a plurality of sections of a road and the direction-of-travel information provided in relation to at least one of the set of the plurality of sections of the road, the acceleration/deceleration information including a plurality of different pieces of acceleration/deceleration information including first acceleration/deceleration information and second acceleration/deceleration information with regard to one identical section of the plurality of sections of the road, the direction-of-travel information including a plurality of different pieces of direction-of-travel information including first direction-of-travel information and second direction-of-travel information with regard to the one identical section of the plurality of sections of the road;

obtain location information of a vehicle; and perform at least one of an acceleration/deceleration drive assist with regard to acceleration and/or deceleration of the vehicle based on the location information and the acceleration/deceleration information, and a direction drive assist with regard to a direction of travel of the vehicle based on the location information and the direction-of-travel information, wherein the circuitry is configured to use at least one of the first acceleration/deceleration information and the first direction-of-travel information in response to the circuitry recognizing a current section of the road that is presently ahead of the vehicle in a current direction-of-travel of the vehicle is a section of the road that is in an expressway mainline, the circuitry is configured to use at least one of the second acceleration/deceleration information and the second direction-of-travel information in response to the circuitry recognizing the current section of the road that is presently ahead of the vehicle in the current direction-of-travel of the vehicle is a section of the road that is oriented toward an expressway exit, and the direction-of-travel information includes at least one of control level information, information regarding a radius of curve, information regarding an angle between a forward direction of the vehicle and the direction of travel of the vehicle, and information regarding angular velocity of rotation of a steering wheel of the vehicle.

16. The drive assist system according to claim 15, wherein an end point of the at least one of the set of the plurality of the sections in the direction-of-travel information is determined based on a point at which a direction of the vehicle is to be changed on the road.

17. The drive assist system according to claim 15, wherein the direction-of-travel information includes information indicating turning to right or turning to left relative to the direction of travel of the vehicle.

18. The drive assist system according to claim 15, wherein the plurality of sections of the road for the acceleration/deceleration information and the plurality of sections of the road for the direction-of-travel information are the same.

19. The drive assist system according to claim 15, wherein the memory is located in a server or the circuitry.

20. The drive assist system according to claim 15, wherein the plurality of sections of the road relate at least one of the acceleration/deceleration information and the direction-of-travel information to features on the road including at least one of power poles, buildings, trees, traffic lights and signs.

21. The drive assist system according to claim 15, wherein an end point of the at least one of the set of the plurality of the sections in the acceleration/deceleration information and/or the direction-of-travel information is different from an end point of a road section corresponding to a link in road network data for route search.

22. The drive assist system according to claim 15, wherein the circuitry is configured to:
calculate a route to a destination; and
obtain the information including at least one of the acceleration/deceleration information and the direction-of-travel information from the memory based on the route.

23. The drive assist system according to claim 15, wherein the circuitry is configured to:
obtain current location information of the vehicle;
calculate a route from the current location to a tentative destination around the current location; and
obtain the information including at least one of the acceleration/deceleration information and the direction-of-travel information from the memory based on the route.

24. A drive assist system, comprising:
circuitry configured to:
obtain information including at least one of acceleration/deceleration information and direction-of-travel information from a memory that stores at least one of the acceleration/deceleration information provided in relation to at least one of a set of a plurality of sections of a road and the direction-of-travel information provided in relation to at least one of the set of the plurality of sections of the road, the acceleration/deceleration information including a plurality of different pieces of acceleration/deceleration information including first acceleration/deceleration information and second acceleration/deceleration information with regard to one identical section of the plurality of sections of the road, the direction-of-travel information including a plurality of different pieces of direction-of-travel information including first direction-of-travel information and second direction-of-travel information with regard to the one identical section of the plurality of sections of the road;
obtain location information of a vehicle; and
perform at least one of an acceleration/deceleration drive assist with regard to acceleration and/or deceleration of the vehicle based on the location information and the acceleration/deceleration information, and a direction drive assist with regard to a direction of travel of the vehicle based on the location information and the direction-of-travel information, wherein the circuitry is configured to use at least one of the first acceleration/deceleration information and the first direction-of-travel information in response to the circuitry recognizing a current section of the road that is presently ahead of the vehicle in a current direction-of-travel of the vehicle is a section of the road that is in an expressway mainline, the circuitry is configured to use at least one of the second acceleration/deceleration information and the second direction-of-travel information in response to the circuitry recognizing the current section of the road that is presently ahead of the vehicle in the current direction-of-travel of the vehicle is a section of the road that is oriented toward an expressway exit, and the memory stores a plurality of different types of the acceleration/deceleration information and/or a plurality of different types of the direction-of-travel information according to a type of the vehicle.

25. The drive assist system according to claim 24, wherein a type of the acceleration/deceleration information is selected according to an engine displacement of the vehicle.

26. The drive assist system according to claim 24, wherein a type of the direction-of-travel information is selected according to a degree of steering operation of the vehicle.

* * * * *